April 30, 1940.　　　B. A. SWENNES　　　2,199,056
PLANETARY TRANSMISSION
Filed June 11, 1938
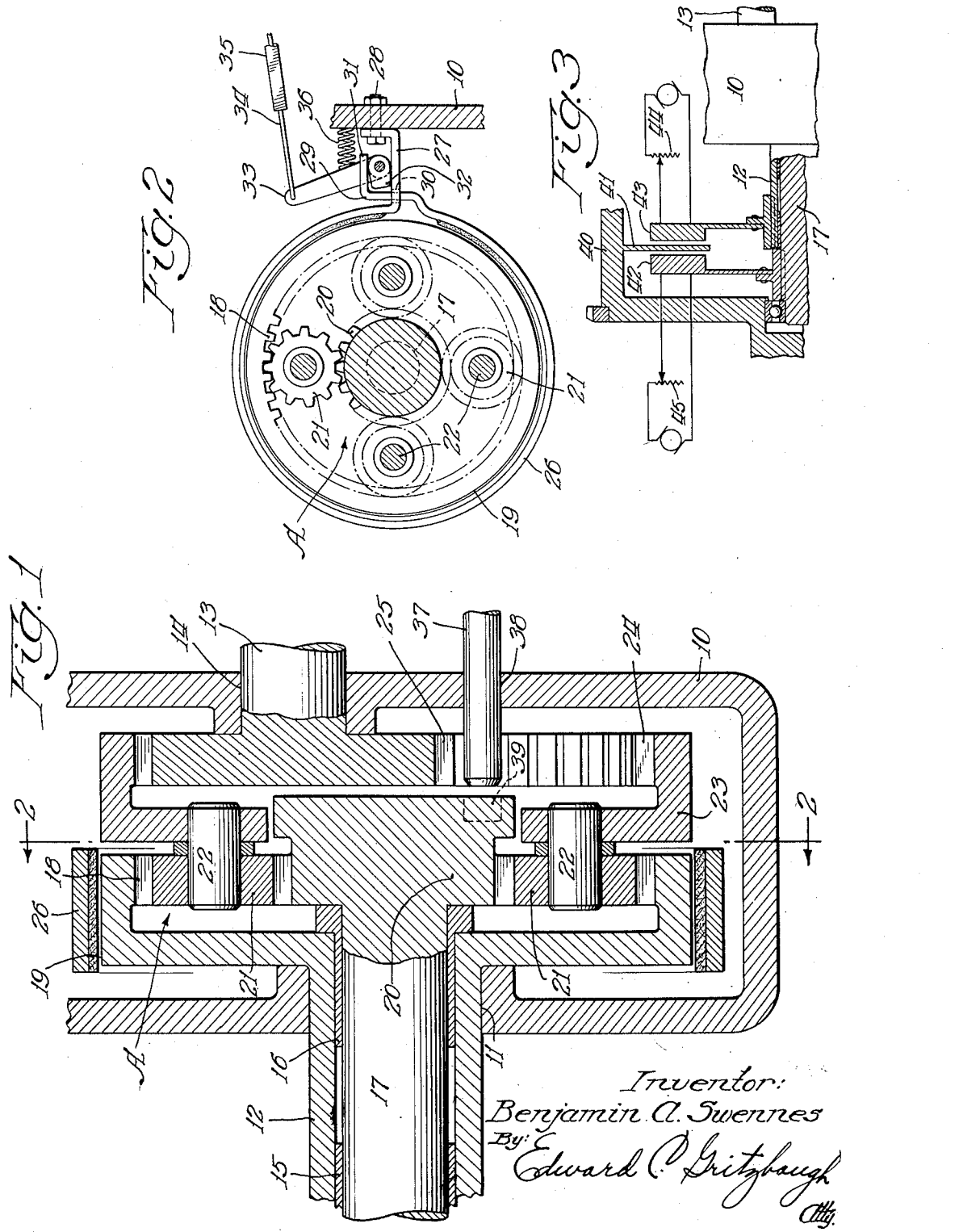
Inventor:
Benjamin A. Swennes
By: Edward P. Gritzbaugh
Atty.

Patented Apr. 30, 1940

2,199,056

UNITED STATES PATENT OFFICE 2,199,056

PLANETARY TRANSMISSION

Benjamin A. Swennes, Rockford, Ill., assignor to Borg-Warner Corporation, Chicago, Ill., a corporation of Illinois Application June 11, 1938, Serial No. 213,120

7 Claims. (Cl. 74—269)

This invention has to do with improvements in change speed power transmission mechanism, and relates particularly to a simplified form thereof adapted for use upon motor driven vehicles.

An object of the present invention is the provision of a multi-speed power transmission unit having a plurality of definite speed ratios between which a change in ratio may take place gradually.

Another object of the present invention is the provision in a change speed device of an improved arrangement of gears whereby the power transmitted through the device will not be accompanied by gear noise.

A further object of the present invention is the provision of a change speed device having constantly meshed gearing including a planetary gear unit of which either of the reaction members may be held against rotation while the other of the members is rotated to effect a predetermined speed ratio.

A still further object of the present invention is the provision of an improved change speed device wherein there are concentric, selectively rotatable driving shafts and a driven shaft displaced laterally from the axes of said drive shafts.

Another object of the present invention is the provision of a three speed transmission mechanism wherein the third speed provides an overdrive ratio.

These and other desirable objects of the present invention will become apparent upon reading the following description in conjunction with the disclosure upon the single sheet of drawings thereby made a part of this specification, and wherein:

Fig. 1 is a sectional view taken axially through a transmission device constructed in accordance with the present invention;

Fig. 2 is a transverse sectional view taken on the line 2—2 of Fig. 1; and

Fig. 3 is a view showing clutching means for connecting the transmission to a driving element.

The same characters of reference are used for designating similar parts shown throughout the drawing and described hereinafter.

Attention should be directed to both Figs. 1 and 2 of the drawing while reading this description. The specific embodiment of the transmission herein set forth comprises concentric drive shafts 12 and 17 and a driven shaft 13. The transmission gear box 10 has a forward wall bearing 11 for shaft 12 and a rear wall bearing 14 for shaft 13. Drive shaft 17 is journalled upon sleeve bearings 15 and 16 disposed within shaft 12. Drive shaft 12 carries a ring gear or reaction member 18 which has a cylindrical exterior periphery providing a braking surface 19. Said ring gear 18 is the orbit gear of a planetary gear unit indicated generally at A. The sun gear 20 of the planetary gear unit A is disposed upon the drive shaft 17. Planet gears 21 journalled respectively upon shafts 22 secured in a planetary gear carrier 23 mesh both with the orbit gear 18 and the sun gear 20. A ring gear 24 is formed upon the planetary gear carrier 23 and meshes with a gear 25 carried by the driven shaft 13.

Suitable means may be employed for selectively coupling the drive shafts 12 and 17 to the vehicle engine. Such connecting means may be friction clutches or other similarly functionable devices such as, for example, electromagnetic field or fluid medium clutches. As illustrated in Fig. 3, the means may comprise an engine driven drum 40 to which is secured an annulus 41. Said annulus 41 is common to two magnetic clutches 42 and 43. Clutch 41 drives shaft 17 and clutch 43 drives shaft 12. Suitable electrical controls 44 and 45 may be used to operate the clutches.

In Fig. 2 a brake band 26 will be seen to encompass the cylindrical periphery 19 of the orbit gear 18. Said brake band has one end 27 anchored to a section of the gear case 10 by means of a bolt 28 or other similar device. The free end 29 of said brake band extends through an aperture 30 in the anchored end of said band and has thereon a normally extending section 31. A cam 32 is disposed between the sections 27 and 31 of the brake band, and may be rotated by means of a lever 33 whereby the cam will be caused to spread those ends of the brake band disposed upon opposite sides thereof whereby to tighten said band upon the periphery of the orbit gear. Said lever 33 may be operated by means of a Bowden wire 34, which may extend through a sheath 35 into the driver's compartment of the vehicle. A compression spring 36 urges the lever 33 into the position for effecting brake release.

Means for holding the sun gear 20 against rotation is provided in the form of a pin 37 slidably disposed in an aperture 38 in the back wall of the gear case 10. A recess 39 may be provided in the rear face of the sun gear 20 for receiving the pin 37 upon said pin being projected forwardly. Means, not shown, may be employed for manipulating the pin 37 axially within the bearing aperture 38.

The operation of the device is as follows:

Power can be transmitted through the present device at any of three selected fixed speed ratios.

The lowest speed ratio is obtained by manipulation of the lever 33 to cause contraction of the brake band 26 upon the orbit gear 18, and by leaving pin 37 withdrawn from recess 39. Thereupon, the mechanism for connecting the driving shaft 17 to the vehicle engine is operated whereby said shaft 17 and the sun gear 20 are rotated in a clockwise direction with respect to a view taken from the front or left end of the device, Fig. 1. The orbit gear 18 then becomes a reaction member while the planetary gears 21 track about the internal gear-tooth section thereof while rotating individually upon their shafts 22. The planetary movement of the gears 21 and the rotational movement of the planetary gear carrier 23 will be at a much lower speed than the rotative speed of the sun gear 20. Ring gear 24 rotates with the planetary gear carrier 23 and causes the driven gear 25 upon the driven shaft 13 to rotate at a speed less than that of drive shaft 17.

Second speed is obtained by releasing the brake band 26 from the orbit gear or reaction member 18, declutching the drive shaft 17 from the vehicle engine and clutching the sun gear 20 to the gear case 10 by means of the pin 37. Thereafter, upon clutching drive shaft 12 to the vehicle prime mover, driving force will be transmitted through said shaft 12 and the ring gear or reaction member 18 to the planetary gears 21 which are caused to track about the gear-tooth section of fixed sun-gear 20, which then serves as a reaction member. Because of the greater extent of the gear-tooth section of the gear 18 with respect to sun gear 20, the gears 21 will be caused to planetate at a greater speed for a given driving shaft speed than when said planetary gears are driven by the sun gear during the first speed connection described above. The driven shaft 13 and the gear 25 thereon are driven from the ring gear 24 in the same manner during first and second speed connections.

Third speed provides an overdrive ratio, that is, a ratio in which the driven shaft 13 is caused to rotate at a speed in excess of the drive shafts 12 and 17. To obtain the overspeed ratio, both brake band 26 and the pin 37 are released respectively from the parts 18 and 20. Both mechanisms for connecting the shafts 12 and 17 with the vehicle engine are actuated whereby said shafts are driven at the same speed. Gears 20 and 18 then function cooperatively as reaction members, each preventing planetary movement of the planetary gears 21 with respect thereto, whereby the planetary gear unit is "locked up" and the gear carrier 23 is caused to rotate at the same speed as the shafts 12 and 17. Inasmuch as the driven gear 25 has a shorter pitch line than the ring gear 24, said gear 25 will be caused to rotate at an overspeed as will the driven shaft 13.

A differential drive of the planetary gear carrier may be had by employing a suitable slip connection between the driving shaft 12 and the vehicle engine. Such slip connecting means may be in the form of a magnetic clutch as shown, or the equivalent. By such connecting means, the speed ratio of the device may be infinitely changed. For example, assume that the device is connected in the third or overdrive ratio with both the brake band 26 and the clutch pin 16 in their disengaged positions as illustrated in Fig. 1. Now if the slipping connecting means of the shaft 12 is gradually released or actuated by manipulation of control 44 so as to permit the shaft 12 to decelerate with respect to the vehicle engine, the speed of the planetary gear carrier 23 will likewise decelerate. Should the shaft 12 be permitted to decelerate to zero speed and the brake band 26 at that time be applied thereto to hold the reaction member 18 against rotation, the speed ratio of the device would then correspond to first speed, and such ratio would have been infinitely varied from the overdrive ratio to first speed ratio. By reversing the process, that is, by starting out with the device connected for first speed drive and by gradually clutching the drive shaft 12 to the engine while releasing the brake band 26 from the reaction member 18, the speed of the drive shaft 12 may be gradually brought up to engine speed and to the speed of the drive shaft 17 coincidentally with the shaft 12 being rigidly connected with the vehicle engine. In this manner the speed ratio of the device may be infinitely changed from a fixed low ratio to an overdrive ratio.

I claim:

1. In a change speed mechanism comprising a planetary gear unit including a sun gear, an orbit gear, planet gears meshing with said sun and orbit gears, a power take-off carrier for said planet gears, an internal gear driven by the carrier, an external gear meshing with the internal gear, means for rotating said sun and orbit gears, said orbit gear rotating means being susceptible of gradual application to provide a gradual increase in speed in said orbit gear, and means for restraining the orbit gear against rotation, whereby the external gear can be made to vary in speed from an under-drive to an overdrive by gradually applying the orbit gear rotating means to vary the speed of the orbit gear from zero to the speed of the rotating means.

2. A change speed transmission mechanism adapted to be interposed between driving and driven shafts comprising in combination a planetary gear set having sun, orbit and planet gears in meshed relation and a planetary gear carrier, and an overdrive mechanism driven by an element of the planetary gear set, said transmission being particularly characterized by the provision of control means for the sun and orbit gears for causing said element to be driven at an infinitely variable rate of speed thereby to cause said driven shaft to be rotated gradually from a condition of underdrive to a condition of overdrive with respect to said drive shaft.

3. A change speed transmission mechanism adapted to be interposed between driving and driven shafts comprising in combination a planetary gear set having sun, orbit and planet gears in meshed relation and a planetary gear carrier, and an overdrive mechanism permanently driven by the planet carrier, said transmission being particularly characterized by the provision of control means for the sun and orbit gears for causing said planet carrier to be driven from said drive shaft at an infinitely variable rate of speed with respect to the driving shaft, thereby to drive the driven shaft by infinite steps from a condition of underdrive with respect to the driving shaft to a condition of overdrive.

4. A change speed transmission mechanism adapted to be interposed between driving and driven shafts comprising in combination a planetary gear set having sun, orbit and planet gears in meshed relation and a planetary gear carrier, and an overdrive mechanism permanently driven by the carrier, said transmission being particularly characterized by the provision of control means for the sun and orbit gears for causing said sun and orbit gears to be driven simultaneously through infinite speed ratio changes from a condition of rest to a condition of synchronism with the drive shaft to cause the driven shaft to be driven through infinite speed ratio gradations from a condition of underdrive to overdrive, and additional means cooperable with the orbit gear for fixing the ratio of speed reduction through the transmission.

5. A change speed transmission mechanism adapted to be interposed between driving and driven shafts comprising in combination a planetary gear set having sun, orbit and planet gears in meshed relation and a planetary gear carrier, and an overdrive mechanism permanently driven by the carrier, said transmission being particularly characterized by the provision of control means for the sun and orbit gears for causing said sun and orbit gears to be driven simultaneously through infinite speed ratio changes from a condition of rest to a condition of synchronism with the drive shaft to cause the driven shaft to be driven through infinite speed ratio gradations from a condition of underdrive to overdrive, and additional means cooperable with the sun gear for fixing the ratio of speed reduction through the transmission.

6. A change speed transmission mechanism adapted to be interposed between driving and driven shafts comprising in combination a planetary gear set having sun, orbit and planet gears in meshed relation and a planetary gear carrier, and an overdrive mechanism driven by the carrier, said transmission being particularly characterized by a compact arrangement of said planetary gears and overdrive mechanism, the overdrive mechanism being comprised of an input internal gear closely axially spaced from said planet gears, and an output external gear meshing with said internal gear, and means interposed between the internal and external overdrive gears for braking the sun gear to obtain a fixed ratio drive through the transmission.

7. A change speed transmission mechanism as described in claim 6, and a housing for the transmission, said means comprising a flange on the sun gear having an axial depression near the periphery thereof and a pin supported in said housing and movable axially into the depression.

BENJAMIN A. SWENNES.